(12) United States Patent
Endo et al.

(10) Patent No.: US 11,774,188 B2
(45) Date of Patent: Oct. 3, 2023

(54) HEAT EXCHANGER AND MANUFACTURING METHOD THEREOF

(71) Applicant: HONDA MOTOR CO., LTD., Tokyo (JP)

(72) Inventors: Tsuneo Endo, Saitama (JP); Yuta Kurosawa, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 17/673,963

(22) Filed: Feb. 17, 2022

(65) Prior Publication Data

US 2022/0307775 A1 Sep. 29, 2022

(30) Foreign Application Priority Data

Mar. 26, 2021 (JP) ................................. 2021-053434

(51) Int. Cl.
| | |
|---|---|
| F28F 1/16 | (2006.01) |
| F28F 1/40 | (2006.01) |
| B23P 15/26 | (2006.01) |
| F28F 13/18 | (2006.01) |
| F28F 1/36 | (2006.01) |
| F24H 1/18 | (2022.01) |

(52) U.S. Cl.
CPC ................ *F28F 1/40* (2013.01); *B23P 15/26* (2013.01); *F28F 1/16* (2013.01); *F28F 13/185* (2013.01);
(Continued)

(58) Field of Classification Search
CPC . F24H 1/18; F24H 1/181; F24H 1/186; F24H 1/187; A47J 27/02; A47J 27/022;
(Continued)

(56) References Cited

U.S. PATENT DOCUMENTS

| | | | | |
|---|---|---|---|---|
| 4,479,359 A | * | 10/1984 | Pelloux-Gervais | ..... F28F 19/04 |
| | | | | 62/50.2 |
| 5,564,589 A | * | 10/1996 | Fu | ............................ A47J 27/02 |
| | | | | 220/573.1 |

(Continued)

FOREIGN PATENT DOCUMENTS

| | | | | | |
|---|---|---|---|---|---|
| DE | | 955355 C | * | 1/1957 | |
| FR | | 2493125 A | * | 5/1982 | ............ A47J 27/022 |

(Continued)

OTHER PUBLICATIONS

Materials Science & Engineering, ASM, pp. 37-58 (Year: 1991).*
Notice of Reasons for Refusal for Japanese Patent Application No. 2021-053434 dated Jan. 10, 2023; 6 pp.

*Primary Examiner* — Eric S Ruppert
(74) *Attorney, Agent, or Firm* — Armstrong Teasdale LLP

(57) ABSTRACT

A heat exchanger includes: a partition wall that separates two fluids of different temperature; and multiple plate-shaped fins formed on at least one surface of the partition wall and each having a pair of heat transfer surfaces. The partition wall and the multiple fins are made of a same metal material to constitute an integrally molded product. The multiple fins each have a curved part and are arranged to be spaced from one another in a direction intersecting with the pair of heat transfer surfaces. Each heat transfer surface of the pair of heat transfer surfaces is formed with multiple grooves having a depth of 100 μm to 400 μm in a thickness direction of each fin.

6 Claims, 8 Drawing Sheets

(52) U.S. Cl.
CPC .................. *F24H 1/18* (2013.01); *F28F 1/36* (2013.01); *F28F 2215/10* (2013.01)

(58) Field of Classification Search
CPC ........ F28F 1/16; F28F 1/20; F28F 1/36; F28F 13/185; F28F 13/187; F28F 2215/10
See application file for complete search history.

(56) References Cited

U.S. PATENT DOCUMENTS

2009/0229806 A1\* 9/2009 Lu .............................. F28F 1/42
    165/177
2010/0224638 A1\* 9/2010 Rubner ................... F22B 37/04
    220/660
2015/0136791 A1\* 5/2015 Povey ..................... A47J 27/02
    220/573.1

FOREIGN PATENT DOCUMENTS

| | | | | | |
|---|---|---|---|---|---|
| GB | 375472 | A | \* | 6/1932 | |
| JP | S57175887 | A | | 10/1982 | |
| JP | H0741268 | U | | 7/1995 | |
| JP | 2006132839 | A | | 5/2006 | |
| JP | 2011054778 | A | | 3/2011 | |
| JP | 2011252192 | A | | 12/2011 | |
| JP | 2012097920 | A | | 5/2012 | |
| JP | 2017150756 | A | | 8/2017 | |
| WO | WO-8404958 | A | \* | 12/1984 | ................ F28F 1/14 |

\* cited by examiner

HEAT EXCHANGER AND MANUFACTURING METHOD THEREOF

TECHNICAL FIELD

The present invention relates to a heat exchanger having a partition wall that separates two fluids of different temperatures and fins formed on the partition wall and a manufacturing method of the heat exchanger.

BACKGROUND ART

Conventionally, heat exchangers using various heat transfer methods are widely used as devices for exchanging heat between two fluids of different temperatures. In surface type (partition wall type) heat exchangers, the two fluids flow in two spaces separated by a partition wall and heat is exchanged between the two fluids due to heat transfer via the partition wall. In some heat exchanges, to increase the heat transfer area (and thereby to improve the heat exchange efficiency), the partition wall is formed with fins or the heat transfer surface of the partition wall is provided with pores.

For example, there is known a heat exchanger having a heat transfer tube through which the coolant circulates and fins contacting the heat transfer tube, wherein each fin has a fin main body provided with fine grooves on a surface thereof (see JP2017-150756A).

Also, for example, there is known a heat exchanger made of aluminum or aluminum alloy, the heat exchanger including metal fins each having an anodized aluminum coating formed on a surface thereof (see JP2011-252192A).

As a result of earnest studies to improve the heat exchange efficiency of the heat exchanger, the inventors of the present application have found that it is particularly effective to reduce the thermal resistance (namely, heat transfer loss) at an interface between each fin and the partition wall and to increase the heat transfer area of the fins (namely, to make the surface structure finer) while making the flow of the fluid in the vicinity of the fin surface smooth (to increase the flow velocity and thereby to reduce the thickness of a temperature boundary layer).

Regarding these points, the conventional technologies described in JP2017-150756A and JP2011-252192A provide no particular teaching or suggestion on reduction of heat transfer loss at the interface between each fin and the partition wall or reduction of thickness of the temperature boundary layer formed in the vicinity of the fin surface. In the conventional technology described in JP2017-150756A, the grooves provided on each fin main body of the heat exchanger are for forming a water repellent film on the fin surface. Also, in the conventional technology described in JP2011-252192A, the anodized aluminum coating formed on the metal fins of the heat exchanger are for suppressing uneven frosting.

SUMMARY OF THE INVENTION

In view of the foregoing background, a primary object of the present invention is to provide a heat exchanger in which the thermal resistance at the interface between each fin and the partition wall is reduced and the heat transfer area of the fins is increased while the flow of the fluid in the vicinity of the fin surface is smooth, and a manufacturing method of such a heat exchanger.

To achieve the above object, one aspect of the present invention provides a heat exchanger (1) comprising: a partition wall (3) that separates two fluids (14, 15) of different temperature; and multiple plate-shaped fins (5) formed on at least one surface (3A) of the partition wall and each having a pair of heat transfer surfaces (21, 21), wherein the partition wall and the multiple fins are made of a same metal material to constitute an integrally molded product, the multiple fins each has a curved part (17) and are arranged to be spaced from one another in a direction intersecting with the pair of heat transfer surfaces, and each heat transfer surface of the pair of heat transfer surfaces is formed with multiple grooves (25) having a depth of 100 μm to 400 μm in a thickness direction of each fin.

According to this aspect, since the partition wall and the multiple fins are integrally molded, the thermal resistance at the interface between each fin and the partition wall is reduced. Also, the formation of grooves of appropriate depths on the multiple fins each having a curved part can increase the heat transfer area of the fins while making the flow of the fluid in the vicinity of the surfaces of the fins smooth. As a result, the heat exchange efficiency of the heat exchanger can be improved.

In the above aspect, preferably, the heat exchanger further comprises plate-shaped members (35) each being made of another metal material having a higher emissivity than the metal material and attached to the partition wall between adjacent ones of the multiple fins.

According to this aspect, even when there is restriction on the metal material used in the fins integrally molded with the partition wall, the plate-shaped members having a higher emissivity can enhance the heat radiation (radiation heat transfer) to improve the uniformity of the fluid temperature in the heat exchanger and hence the heat exchange efficiency of the heat exchanger.

In the above aspect, preferably, another surface (3B) of the partition wall that is not provided with the fins is formed with multiple pores each having a diameter of 10 nm to 30 nm.

According to this aspect, the fins formed on the one surface of the partition wall promote heat transfer between one of the two fluids (for example, gas) and the partition wall while the pores form on the other surface of the partition wall promote heat transfer between the other of the two fluids (for example, liquid) and the partition wall.

In the above aspect, preferably, the partition wall constitutes a bottomed tubular body, the multiple fins are each connected to a bottom surface and a side circumferential surface of the bottomed tubular body that form an outer surface of the bottomed tubular body, in a first portion (17) of each fin connected to the bottom surface of the bottomed tubular body, the multiple grooves each extend toward the bottom surface, and in a second portion (19) of each fin connected to the side circumferential surface of the bottomed tubular body, the multiple grooves each extend along the side circumferential surface.

According to this aspect, the fluid in the vicinity of the bottom surface of the bottomed tubular body is guided by the multiple grooves to flow toward the bottom surface, whereby heat transfer at the bottom portion of the bottomed tubular body can be promoted. Also, the fluid in the vicinity of the side circumferential surface of the bottomed tubular body is guided by the multiple grooves to flow along the side circumferential surface, whereby heat transfer at the side circumferential portion of the bottomed tubular body can be promoted.

In the above aspect, preferably, the heat exchanger further comprises a shell (9) which is provided to cover outer sides of the multiple fins and to which outer edge portions of the multiple fins opposite from the partition wall are each connected.

According to this aspect, the shell covering the outer sides of the multiple fins can efficiently guide the fluid to the fins provided on the bottomed tubular body.

In the above aspect, preferably, the heat exchanger further comprises multiple pin-shaped fins (7) provided to protrude outward on a region of the bottom surface of the bottomed tubular body where the multiple fins are not formed.

According to this aspect, the pin-shaped fins can effectively promote heat transfer at the bottom portion of the bottomed tubular body.

In the above aspect, preferably, the curved part of each of the multiple fins is curved helically.

According to this aspect, the flow of the fluid in the vicinity of the surfaces of the multiple fins can be made smooth (the flow velocity of the fluid is increased).

In the above aspect, preferably, each fin has a cross section tapering in a direction away from the partition wall.

According to this aspect, stagnation of fluid between adjacent fins can be suppressed.

To achieve the above object, another aspect of the present invention provides a manufacturing method of a heat exchanger (1), the method comprising integrally molding a partition wall (3) that separates two fluids (14, 15) of different temperatures and multiple plate-shaped fins (5) formed on at least one surface (3A) of the partition wall and each having a pair of heat transfer surfaces (21, 21) by using a same metal material based on additive manufacturing, wherein the multiple fins each have a curved part (17) and are arranged to be spaced from one another in a direction intersecting with the pair of heat transfer surfaces, and each heat transfer surface of the pair of heat transfer surfaces is formed with multiple grooves (25) having a depth of 100 μm to 400 μm in a thickness direction of each fin.

According to this aspect, since the partition wall and the multiple fins are integrally molded based on additive manufacturing, the thermal resistance at the interface between each fin and the partition wall is reduced. Also, the formation of grooves of appropriate depths on the multiple fins each having a curved part can increase the heat transfer area of the fins while making the flow of the fluid in the vicinity of the surfaces of the fins smooth. As a result, the heat exchange efficiency of the heat exchanger can be improved.

According to the foregoing configuration, it is possible to provide a heat exchanger in which the thermal resistance at the interface between each fin and the partition wall is reduced and the heat transfer area of the fins is increased while the flow of the fluid in the vicinity of the fin surface is smooth, and a manufacturing method of such a heat exchanger.

DETAILED DESCRIPTION OF THE INVENTION

In the following, a heat exchanger and a manufacturing method thereof according to an embodiment of the present invention will be described with reference to the drawings.

Figure 1:
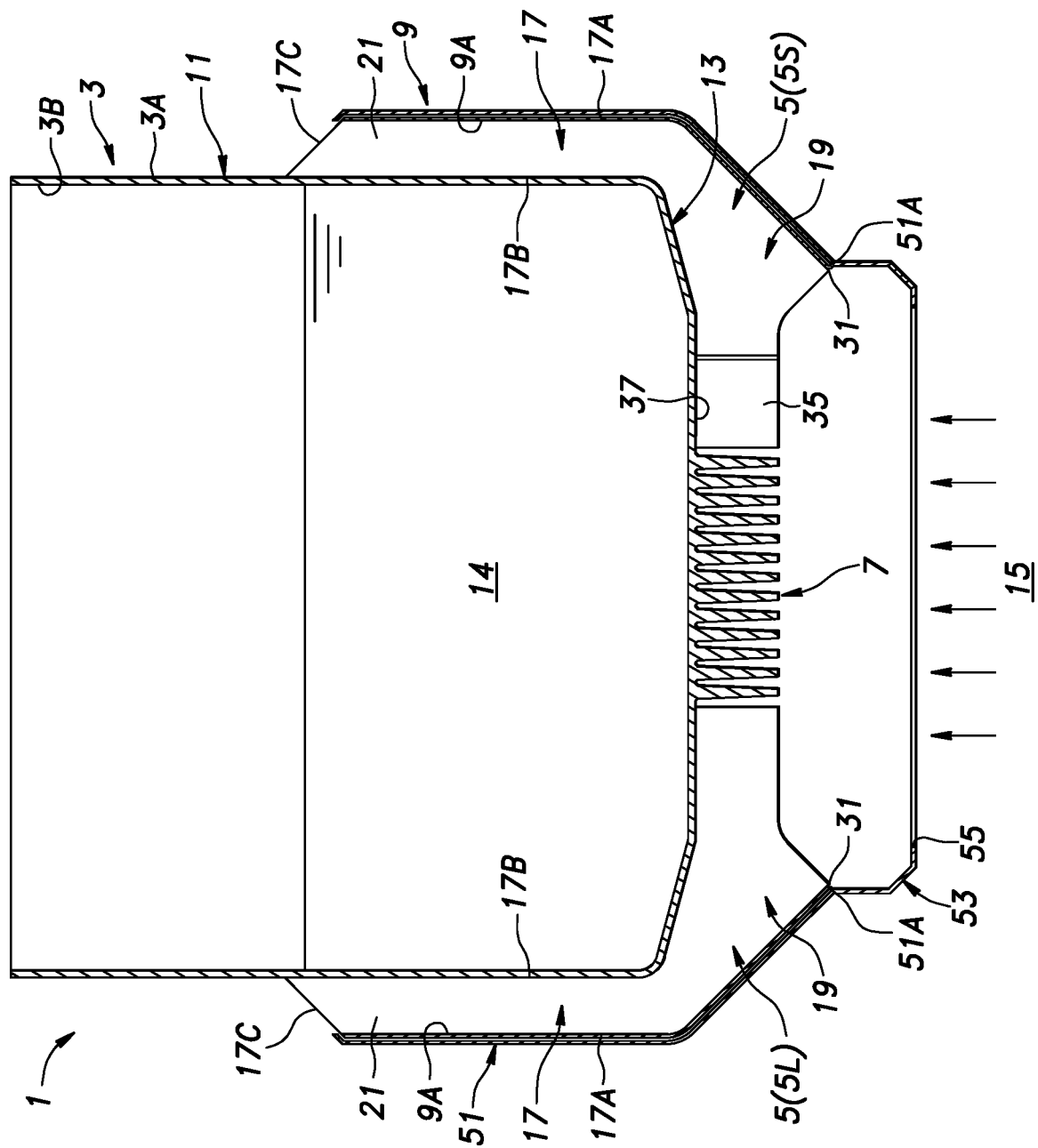
FIG. 1 is a sectional view showing a schematic structure of a heat exchanger 1 according to an embodiment of the present invention.

As shown in FIG. 1, a heat exchanger 1 is mainly constituted of a partition wall 3, multiple plate-shaped fins 5, multiple pin-shaped fins 7, and a shell 9. In the heat exchanger 1, two fluids of different temperatures (first fluid and second fluid) separated by the partition wall 3 indirectly contact each other so that heat is exchanged therebetween.

The partition wall 3 forms a body of the heat exchanger 1 as a bottomed tubular body. The partition wall 3 has a substantially cylindrical side circumferential portion 11 and a bottom portion 13 provided to close one of the openings of the side circumferential portion 11 (here, the lower opening). Inside the partition wall 3, a first fluid 14 which includes a liquid having a relatively low temperature and to be heated (for example, water of normal temperature) is contained. Also, outside the partition wall 3, a second fluid 15 which includes a gas having a higher temperature than the first fluid (here, a high temperature combustion gas from a combustor not shown in the drawings) flows.

The partition wall 3 is an integrally molded product that is integral with the fins 5 and the pin-shaped fins 7. The partition wall 3, the fins 5, and the pin-shaped fins 7 are made of a same metal material (here, aluminum).

Figure 2:
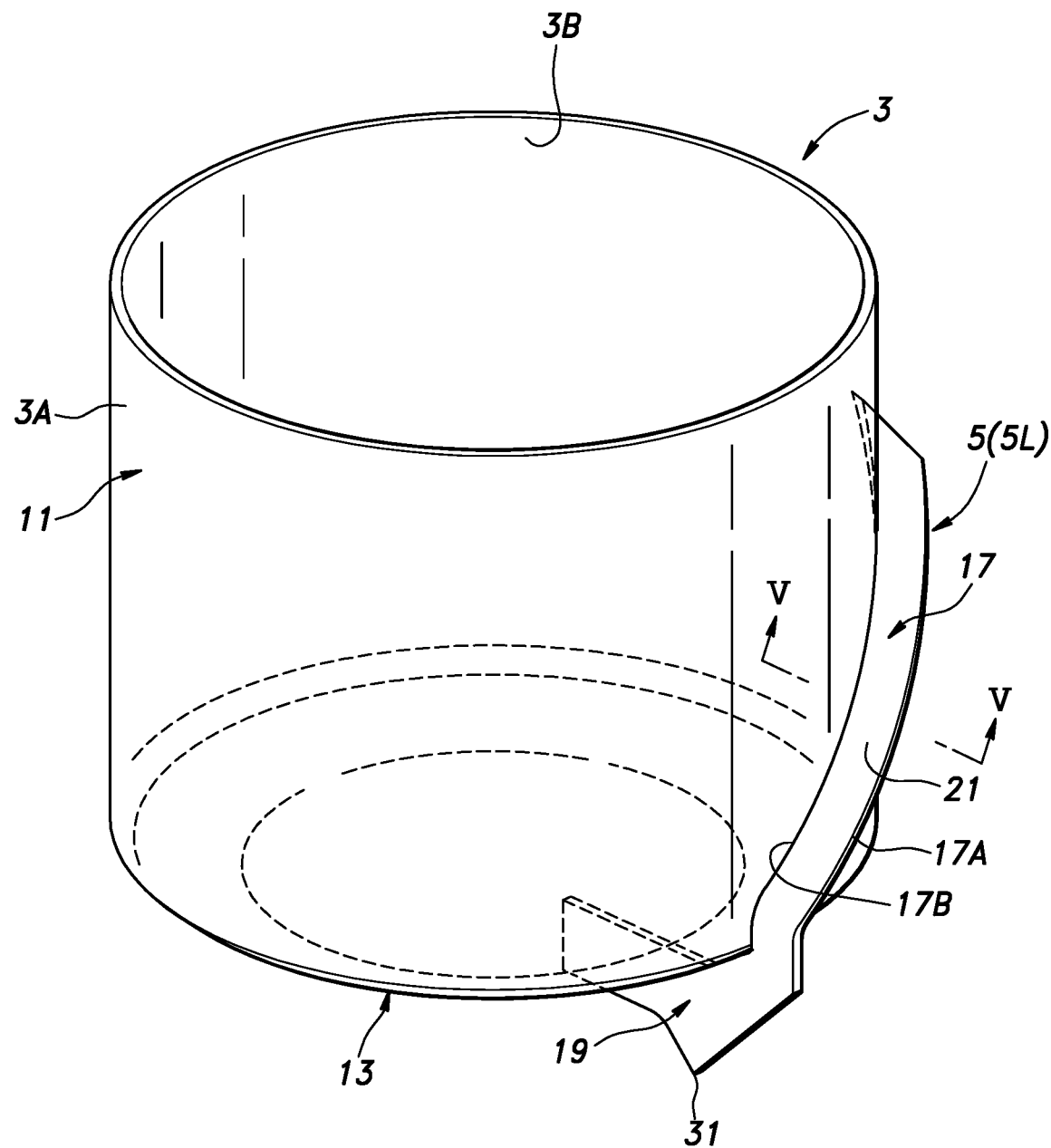
FIG. 2 is a perspective view showing one fine formed on a partition wall 3.

An outer surface (one surface) 3A of the partition wall 3 is formed with the multiple fins 5. As shown in FIG. 2 also, each fin 5 extends in a longitudinal direction thereof from the side circumferential portion 11 to the bottom portion 13 of the partition wall 3. Each fins 5 includes a side portion (first portion) 17 having an inner edge connected to the outer surface of the side circumferential portion 11 and a base portion (second portion) 19 having an inner edge connected to the outer surface of the bottom portion 13.

In the present embodiment, the multiple fins 5 include two types of fins. Specifically, as shown in FIG. 1, the multiple fins 5 include fins having a relatively long base portion 19 and fins having a relatively short base portion 19. In the following, when these two types of fins should be distinguished, they will be referred to as long fins 5L and short fins 5S. Also, the reference signs denoting the parts of the long fins 5L and the short fins 5S may be added "L" and "S" as necessary.

Figure 3:
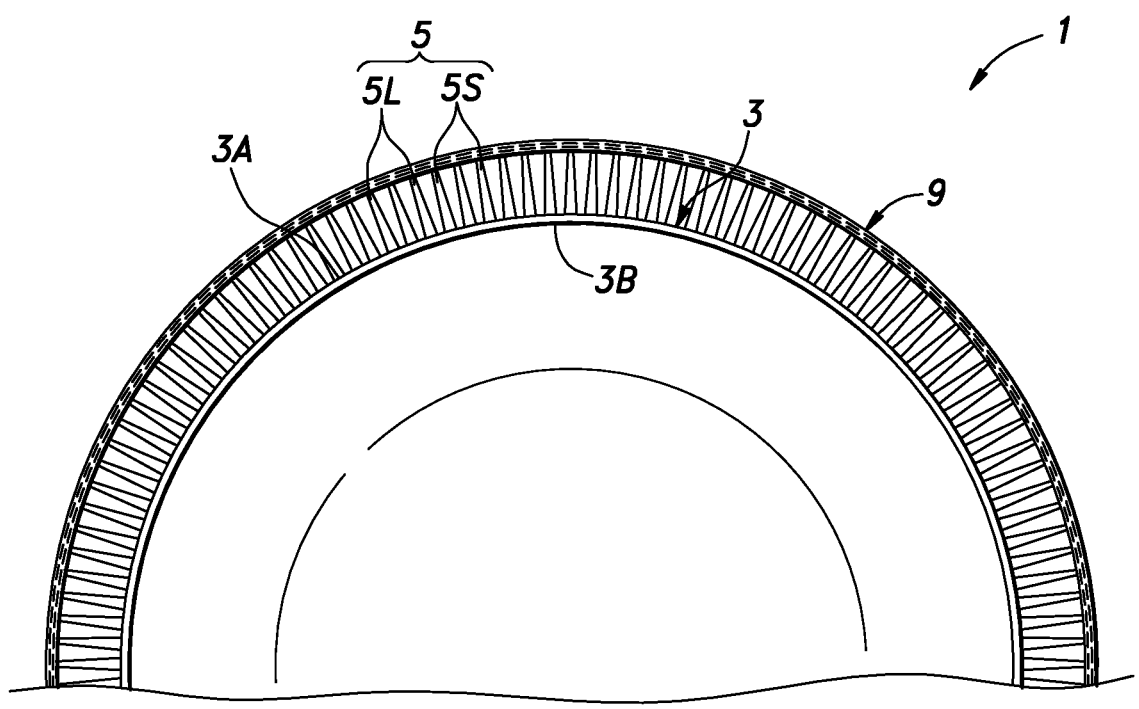
FIG. 3 is a partial top view of the heat exchanger 1.

Each fin 5 has a pair of heat transfer surfaces 21, 21 (main heat transfer surfaces) disposed to intersect with or be perpendicular to the circumferential direction of the side circumferential portion 11. As shown in FIG. 3 also, the multiple fins 5 are arranged to be spaced apart from one another in the circumferential direction (namely, in the direction intersecting with the pair of heat transfer surfaces 21, 21) over the entire circumference of the side circumferential portion 11. The long fins 5L and the short fins 5S are disposed alternately in the circumferential direction.

Figure 4:
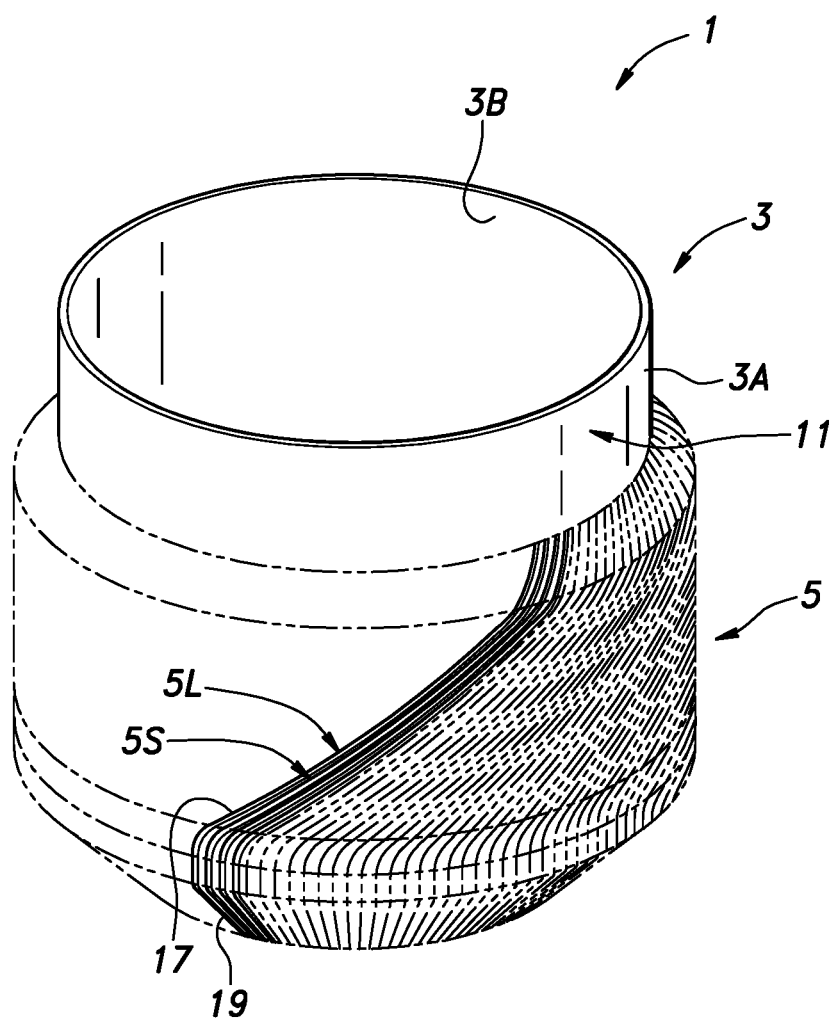
FIG. 4 is a perspective view of the heat exchanger 1 excluding a shell 9.

As shown in FIG. 4, the side portion 17 of each fin 5 constitutes a helically curved part extending obliquely upward (namely, in the longitudinal direction) from the upper edge of the base portion 19 along the side circumferential portion 11 of the partition wall 3. In this way, by curving at least a part of each fin 5, the flow of the fluid in the vicinity of the surfaces of the multiple fins 5 can be made smoother (the flow velocity of the fluid can be increased).

The width of the side portion 17 of each fin 5 (the distance between an outer edge 17A and an inner edge 17B) is approximately the same substantially over the entirety of the side portion 17 in the longitudinal direction (see FIG. 1) However, the upper edge 17C of the side portion 17 is formed to make an acute angle relative to the outer surface 3A of the partition wall 3 in side view. Note that it is only required that at least a part of the side portion 17 forms the curved part (namely, the part formed with curved surfaces serving as heat transfer surfaces). Also, the shape of the curved part is not limited to helical, and the curved part is only required to have at least a curved surface.

Figure 5:
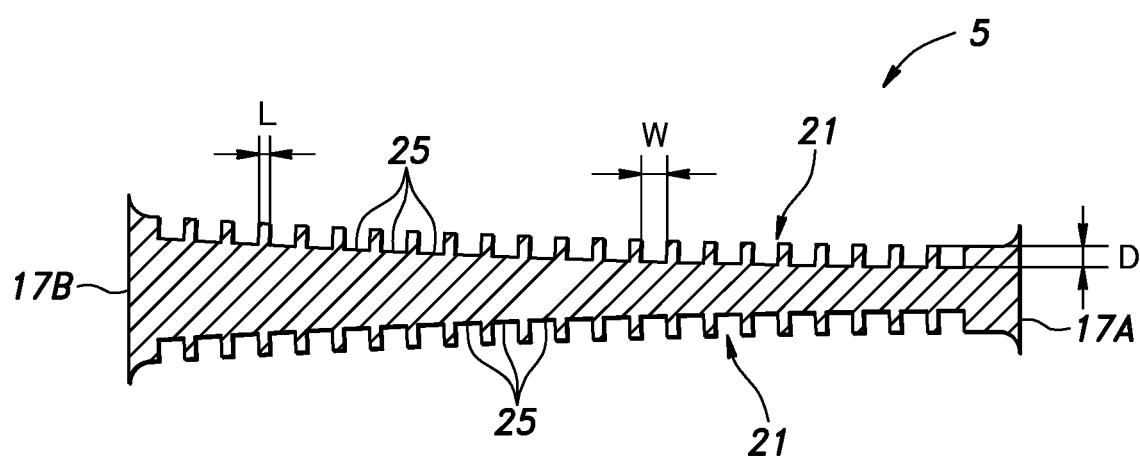
FIG. 5 is a sectional view of a fin 5.

As shown in FIG. 5, the side portion 17 of each fin 5 is formed to taper from the inner edge 17B toward the outer edge 17A in the cross section perpendicular to the longitudinal direction (the cross section taken along line V-V in FIG. 2). Thus, the space between adjacent fins 5 (namely, the space between adjacent heat transfer surface 21) increases gradually from the inner side (on the side of the partition wall 3) toward the outer side. Thereby, stagnation of fluid between adjacent fins 5 can be suppressed.

Parts of the pair of heat transfer surfaces 21, 21 in the side portion 17 are formed with multiple grooves 25 arranged at prescribed intervals from the inner edge 17B to the outer edge 17A. From the viewpoint of improving the heat exchange efficiency, the depth D of the multiple grooves 25 (the depth in the thickness direction of each fin 5 substantially perpendicular to the heat transfer surface 21, 21) is preferably set to 100 μm to 400 μm. Similarly, the width W of the multiple grooves 25 is preferably set to about twice the depth D (200 μm to 800 μm). Also, the interval L between adjacent grooves 25 is preferably set to 100 μm to 300 μm. Note that it is only required that the grooves 25 be formed on at least one of the pair of heat transfer surfaces 21, 21.

The base portion 19 of each fin 5 has a substantially straight shape in the longitudinal direction (as seen in bottom view). The base portion 19 extends from the lower edge 17D of the side portion 17 (see FIG. 6) along the bottom portion 13 of the partition wall 3. In side view, the base portion 19 is provided with a projection 31 protruding downward to have a substantially right angle tip. Though not shown in the drawings, the base portion 19 is configured to taper from the inner edge toward the outer edge similarly to the side portion 17.

Figure 6:
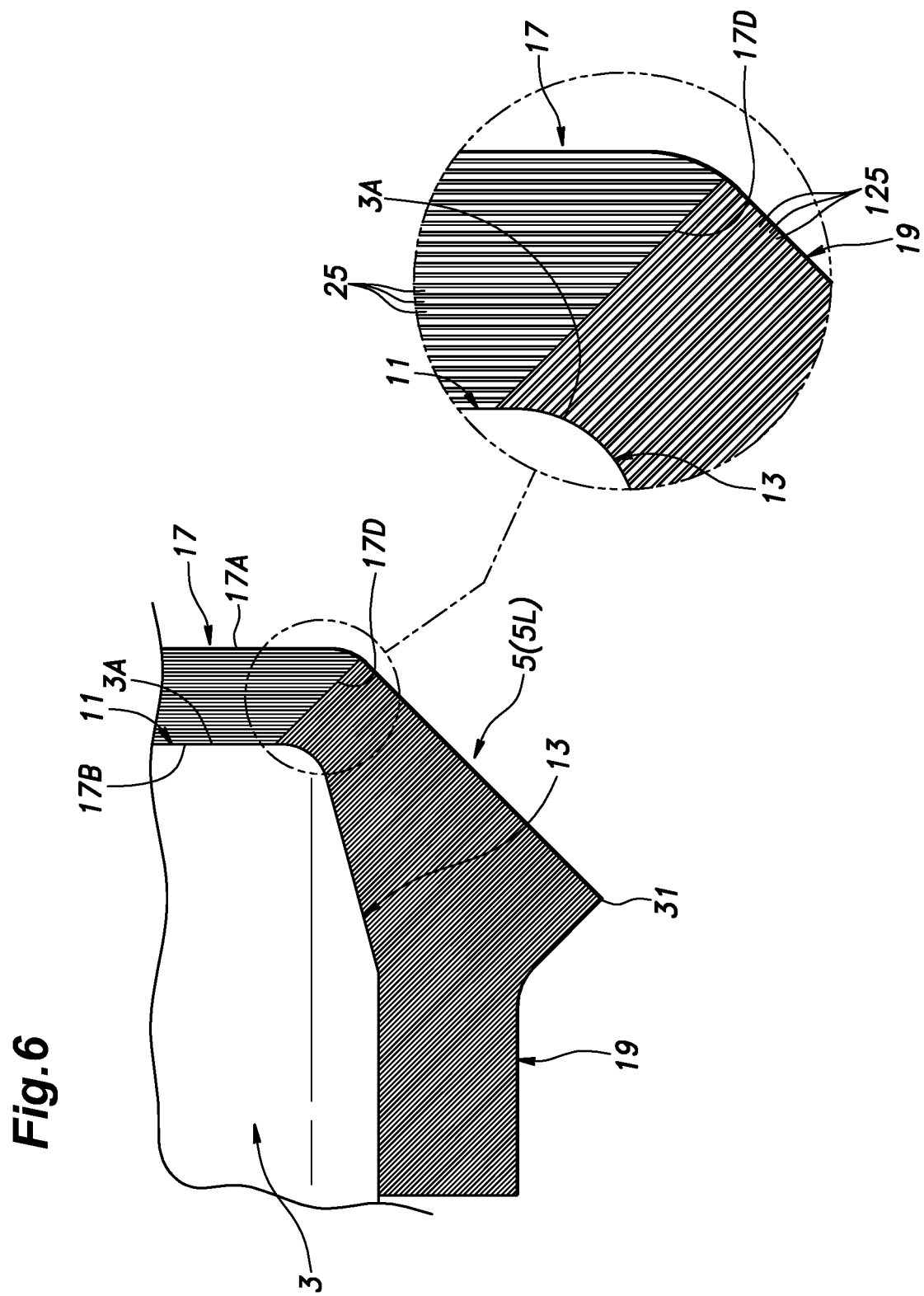
FIG. 6 is an explanatory diagram showing the fins 5 a detailed structure of the heat transfer surface 21.

Parts of the pair of heat transfer surfaces 21, 21 in the base portion 19 are formed with multiple grooves 125 similar to the grooves 25 in the side portion 17, but the extension direction of the grooves 125 differs from that of the grooves 25 in the side portion 17. Specifically, as shown in FIG. 6, the grooves 25 in the side portion 17 each extend in the longitudinal direction (here, the substantially vertical direction) along a part of the outer surface 3A in the side circumferential portion 11 of the partition wall 3 (namely, along the side circumferential surface). On the other hand, the grooves 125 in the base portion 19 each extend toward a part of the outer surface 3A in the bottom portion 13 of the partition wall 3 (namely, toward the bottom surface) (in a direction inclined leftward and upward in FIG. 6) The depth, width, and interval of the grooves 125 may be set similarly to those of the grooves 25 in the side portion 17.

With the above configuration, the second fluid in the vicinity of the bottom surface of the bottomed tubular body is guided by the multiple grooves 125 to flow toward the bottom surface, whereby heat transfer at the bottom portion 13 of the bottomed tubular body is promoted. Also, the second fluid in the vicinity of the side circumferential surface of the bottomed tubular body is guided by the multiple grooves 25 to flow along the side circumferential surface, whereby heat transfer at the side circumferential portion 11 of the bottomed tubular body is promoted.

Note that in the present embodiment, the partition wall 3 constitutes a bottomed tubular body and accordingly each fin 5 has the base portion 19, but in a case where the partition wall 3 constitutes another structure (for example, a tubular body), the base portion 19 may be omitted.

Figure 7:
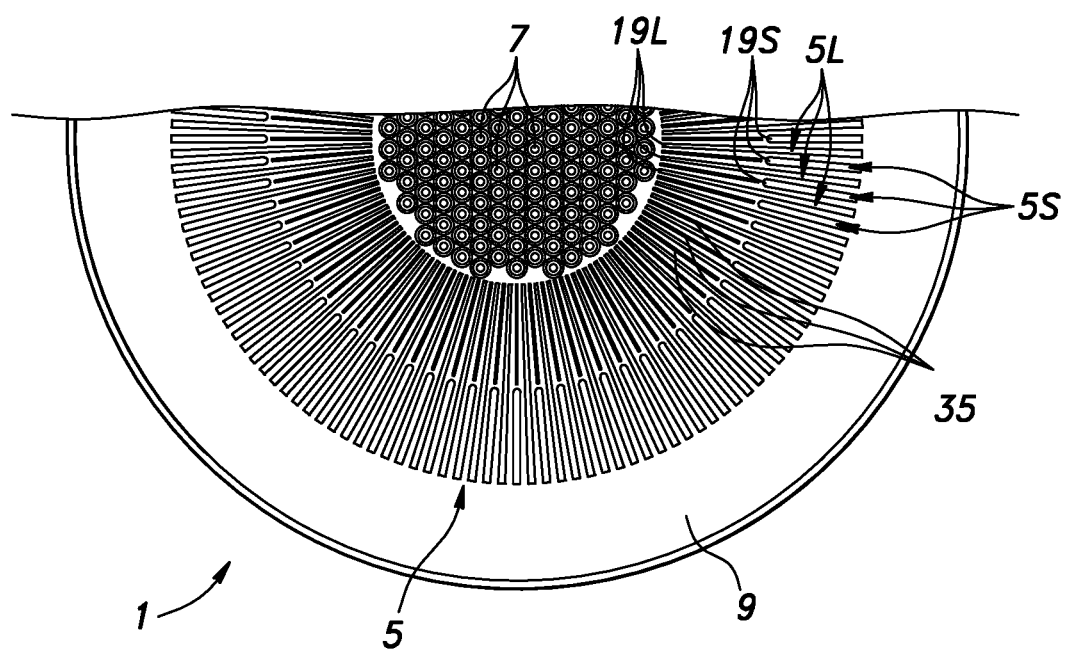
FIG. 7 is a partial bottom view of the heat exchanger 1.

As shown in FIG. 7, the bottom portion 13 of the partition wall 3 is provided with multiple plate-shaped members 35 each being disposed between circumferentially adjacent ones of the long fins 5L. Each plate-shaped member 35 has a substantially rectangular shape (see FIG. 1). In bottom view, each plate-shaped member 35 extends on an extension line of an end (inner edge) of the short base portion 19S of each short fin 5S (namely, extends in the radial direction). Therefore, the multiple plate-shaped members 35 are provided in the same number as the number of the short fins 5S.

The inner edge of each plate-shaped members 35 is at substantially the same position as the inner edge of the base portion 19L of each long fin 5L in the radial direction. Thereby, in the bottom portion 13 of the partition wall 3, the inner edges of the base portions 19L of the multiple long fins 5L and the inner edges of the multiple plate-shaped members 35 jointly define a substantially circular region in which the multiple pin-shaped fins 7 are disposed. Note that, in bottom view (or in a horizontal cross section), the base portion 19L of each long fin 5L is formed to taper in the radially inward direction.

Each plate-shaped member 35 is made of a metal material (here, stainless steel) having a higher emissivity than the metal material (here, aluminum) forming the fins 5. As shown in FIG. 1, the multiple plate-shaped members 35 are respectively fitted into multiple mounting grooves 37 formed on the outer surface 3A in the bottom portion 13 of the partition wall 3. Note that the material forming the plate-shaped members 35 is not limited to stainless steel and any metal material having a higher emissivity than at least the metal material forming the fins 5 may be used.

Figure 8:
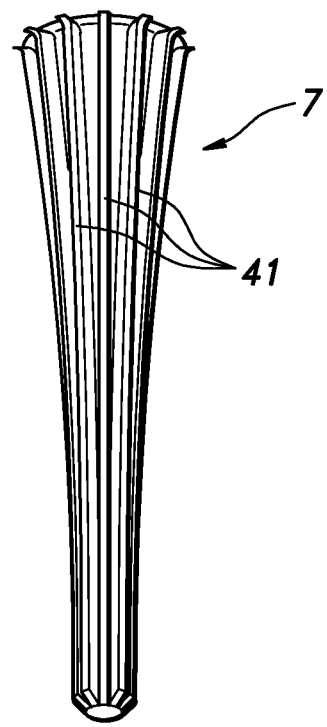
FIG. 8 is a perspective view of a pin-shaped fin 7.

As shown in FIG. 8, each pin-shaped fin 7 has a tapering cylindrical columnar (or conical) shape. The circumferential surface of each pin-shaped fin 7 is formed with multiple ridges 41 extending in the longitudinal direction (protruding direction). The multiple ridges 41 are disposed at prescribed intervals in the circumferential direction.

Due to the multiple ridges 41, the surface area of each pin-shaped fin 7 is increased. Also, since the multiple ridges 41 are formed on each pin-shaped fin 7 having a tapering shape, an effect of reducing the thickness of a temperature boundary layer formed in the vicinity of the surface of the pin-shaped fin 7 can be obtained. As a result, the thermal resistance to the first fluid 14 inside the partition wall 3 is decreased and convection heat transfer of the first fluid is promoted.

The inner surface (the other surface) of 3B of the partition wall 3 is formed with a non-sealed anodized aluminum coating. The anodized aluminum coating is formed with multiple pores each having a pore diameter of 10 nm to 30 nm. Thereby, in the heat exchanger 1, the fins 5 formed on the outer surface 3A of the partition wall 3 promote heat transfer between the second fluid and the partition wall 3, while the pores formed on the inner surface 3B of the partition wall 3 promote heat transfer between the first fluid and the partition wall 3. However, the anodized aluminum coating may be omitted. Also, the anodized aluminum coating may be formed only a part of the inner surface 3B of the partition wall 3 (for example, only the inner surface 13B of the bottom portion 13).

The shell 9 is substantially tubular in shape and is provided to cover the outer sides of the multiple fins 5, as shown in FIG. 1. Thereby, the inner surface 9A of the shell 9 and the outer surface 3A of the partition wall 3 define a flow path for the second fluid 15 and the multiple fins 5 are positioned within the flow path.

The shell 9 has an upper portion 51 connected to outer edges of the multiple fins 5 located opposite from the partition wall 3 and a lower portion 53 connected to the lower edge of the upper portion 51 and extending downward. The lower edge 51A of the upper portion 51 is connected to the corner of the projection 31 of the base portion 19 of each fin 5. The lower portion 53 is positioned outside (here, below) the pin-shaped fins 7 and has an opening 55 which is substantially circular in shape. The opening 55 constitutes an inlet for the second fluid 15. Due to such a shell 9, it is possible to efficiently guide the second fluid to the fins 5 provided on the bottomed tubular body.

In the manufacture of the heat exchanger 1 having the above-described structure, the partition wall 3, the multiple fins 5, and the multiple pin-shaped fins 7 are integrally molded using a known 3D printing technology (additive manufacturing). The concrete processing method used in additive manufacturing is not particularly limited so long as the above-described structure can be achieved. For example, the heat exchanger 1 is molded by simultaneously jetting the metal powder and irradiating laser (or electron beam) onto a target part to form layers of molten metal powder in the aforementioned shape.

The shell 9 may be integrally molded with the partition wall 3. Alternatively, the shell 9 may be formed of a metal material different from the metal material forming the partition wall 3 and thereafter attached by welding or the like so as to cover the outer sides of the multiple fins 5.

The non-sealed anodized aluminum coating on the inner surface 3B of the partition wall 3 is formed by a known anodizing process (aluminum anodization process). The structure (pore diameter or the like) of the multiple pores of the anodized aluminum coating may be checked by using a field emission scanning electron microscope (FE-SEM), for example.

When using the heat exchanger 1, the user pours water into the inside of the partition wall 3 as the first fluid and thereafter start a combustor (for example, a gas burner) disposed below the heat exchanger 1, for example. Consequently, the combustion gas of the combustor serving as the second fluid is introduced through the opening 55 of the shell 9. The combustion gas flows between the multiple fins 5 positioned between the partition wall 3 and the shell 9 and is discharged from an open upper portion of the shell 9. At this time, the heat of the combustion gas is transferred to the partition wall 3, the fins 5, and the pin-shaped fins 7 and is further transferred to the first fluid (water) via the inner surface 3B of the partition wall 3. Due to such heat exchange between the combustion gas and the water, it is possible to increase the temperature of the water inside the partition wall 3 (eventually, to boil the water).

In this way, in the heat exchanger 1, since the partition wall 3 and the multiple fins 5 are integrally molded, the thermal resistance at the interface between each fin 5 and the partition wall 3 is reduced. Also, the formation of grooves of appropriate depths on the multiple fins 5 each having a curved part (here, the side portion 17) can increase the heat transfer area of the fins 5 while making the flow of the second fluid in the vicinity of the surfaces of the fins 5 smooth. As a result, the heat exchange efficiency of the heat exchanger 1 can be improved.

A concrete embodiment has been described in the foregoing, but the present invention is not limited to the above embodiment and may be modified or altered in various ways.

The partition wall 3 of the heat exchanger 1 is not limited to the bottomed tubular body, and various shapes used in known heat exchangers may be adopted. For example, the partition wall 3 may constitute a tubular body that separates the first fluid and the second fluid. In that case, the first fluid flows in a prescribed direction inside the partition wall 3. Also, the fins 5 of the heat exchanger 1 are only required to be formed on at least one of the outer surface 3A and the inner surface 3B of the partition wall 3.

Also, the first fluid and the second fluid do not necessarily have to be a combination of a liquid and a gas, any combination of fluids (for example, a combination of liquids or a combination of gases) may be adopted. The heat exchanger 1 is only required to use at least two fluids and may use three or more fluids to conduct heat exchange therebetween.

Also, in the heat exchanger 1, even when there is restriction on the metal material used in the fins 5 integrally molded with the partition wall 3 (for example, the metal materials that can be used in additive manufacturing are limited), the plate-shaped members 35 having a higher emissivity can enhance the heat radiation (radiation heat transfer) to improve the uniformity of the fluid temperature in the heat exchanger 1 and hence the heat exchange efficiency of the heat exchanger 1.

The heat exchanger 1 may be used in a refrigerator, an industrial heat exchanger, a plate-shaped heat exchanger, pipe-shaped passage-type heat exchanger, for example. Also, because the heat exchanger 1 may be used as a part of a device or a machine that has a partition wall and fins and thereby can function as a heat exchanger. Such a heat exchanger 1 may be used, for example, in a fluid passage structure of an air-cooled engine head, a radiator, an oil cooler, a water boiler, an air-conditioning facility, an exhaust gas recirculation (EGR) cooler, a Stirling engine, or the like.

The invention claimed is:
1. A heat exchanger comprising:
  a partition wall that separates two fluids of different temperature; and
  multiple plate-shaped fins formed on at least one surface of the partition wall and each having a pair of heat transfer surfaces,
  wherein the partition wall and the multiple fins are made of a same metal material to constitute an integrally molded product,
  the multiple fins each have a curved part and are arranged to be spaced from one another in a direction intersecting with the pair of heat transfer surfaces, and
  each heat transfer surface of the pair of heat transfer surfaces is formed with multiple grooves having a depth of 100 µm to 400 µm in a thickness direction of each fin,
  wherein the heat exchanger further comprises plate-shaped members each being made of another metal material having a higher emissivity than the metal material of the partition wall and the multiple fins, and attached to the partition wall between adjacent ones of the multiple fins, wherein the partition wall constitutes a bottomed tubular body, and the plate-shaped members are fitted into multiple mounting grooves formed on an outer surface in a bottom portion of the partition wall, wherein the multiple fins are each connected to a bottom surface and a side circumferential surface of the bottomed tubular body that form an outer surface of the bottomed tubular body, in a first portion of each fin connected to the bottom surface of the bottomed tubular body, the multiple grooves each extend toward the bottom surface, and in a second portion of each fin connected to the side circumferential surface of the bottomed tubular body, the multiple grooves each extend substantially vertically.

2. The heat exchanger according to claim 1, wherein another surface of the partition wall that is not provided with the fins is formed with multiple pores each having a diameter of 10 nm to 30 nm.

3. The heat exchanger according to claim 1, further comprising a shell which is provided to cover outer sides of the multiple fins and to which outer edge portions of the multiple fins opposite from the partition wall are each connected.

4. The heat exchanger according to claim 1, further comprising multiple pin-shaped fins provided to protrude outward on a region of the bottom surface of the bottomed tubular body where the multiple fins are not formed.

5. The heat exchanger according to claim 1, wherein the curved part of each of the multiple fins is curved helically.

6. The heat exchanger according to claim 1, wherein each fin has a cross section tapering in a direction away from the partition wall.

* * * * *